United States Patent [19]

Gregor et al.

[11] 3,760,366

[45] Sept. 18, 1973

[54] UNPRINTABLE CHARACTER RECOGNITION

[75] Inventors: John S. Gregor, Endicott; Raymond Radlinsky, Endwell, both of N.Y.

[73] Assignee: International Business Machines Corporation, Armonk, N.Y.

[22] Filed: Sept. 15, 1971

[21] Appl. No.: 180,680

[52] U.S. Cl. .............................................. 340/172.5

[51] Int. Cl. .......................... G06f 3/12, G06f 11/00

[58] Field of Search ....................... 340/172.5, 146.1; 101/93 C

[56] References Cited

UNITED STATES PATENTS

| | | | |
|---|---|---|---|
| 3,614,740 | 10/1971 | Delagi et al. | 340/172.5 |
| 3,611,304 | 10/1971 | Hemdal | 340/172.5 |
| 3,601,812 | 8/1971 | Weisbecker | 340/172.5 |
| 3,585,605 | 6/1971 | Gardner et al. | 340/172.5 |
| 3,582,897 | 6/1971 | Marsh | 340/172.5 |
| 3,573,744 | 4/1971 | Rigazio | 340/172.5 |
| 3,553,653 | 1/1971 | Krock | 340/172.5 |
| 3,546,681 | 12/1970 | Korn et al. | 340/172.5 |
| 3,343,131 | 9/1967 | Bloom et al. | 340/172.5 |
| 3,193,802 | 7/1965 | Deerfield | 340/172.5 |
| 2,993,437 | 7/1961 | Demer et al. | 101/93 |

*Primary Examiner*—Paul J. Henon
*Assistant Examiner*—Paul R. Woods
*Attorney*—Francis W. Giolma et al.

[57] ABSTRACT

A distinctive code for each character that appears on the type train of a printer is stored in a train image field. At the time of loading this field an associative bit is stored at a particular address in an associative field, the address being identifiable with the numerical value of the bits in the code for each character. When characters to be printed are loaded into the print line buffer of the printer, the address for the associative bit is accessed directly from the print line buffer data register and the presence of the bit identifies the character as having a matching code in the train image field.

9 Claims, 7 Drawing Figures

United States Patent [19]
Gregor et al.
[11] 3,760,366
[45] Sept. 18, 1973
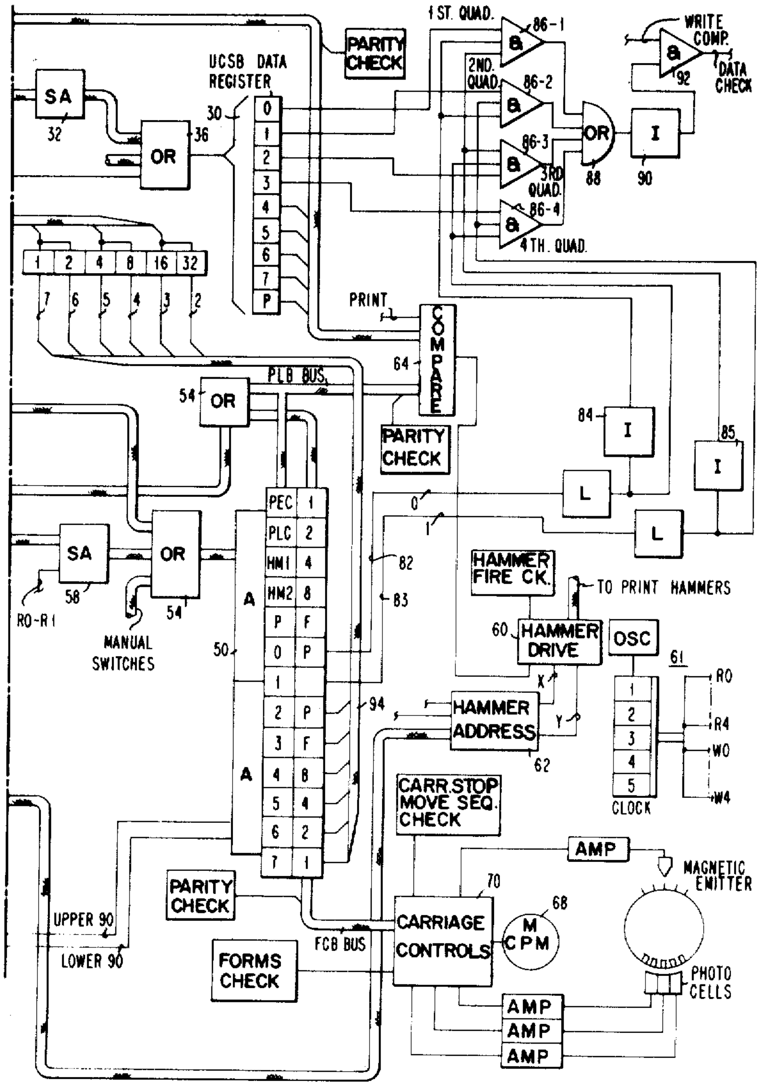

*INVENTORS*
JOHN S. GREGOR
RAYMOND RADLINSKY

BY Francis V. Giolma
*ATTORNEY*

UNPRINTABLE CHARACTER RECOGNITION

FIELD OF INVENTION

This invention relates generally to printing and it has reference in particular to a method for checking to determine whether every character to be printed appears in the type train of the printer.

DESCRIPTION OF THE PRIOR ART

Unprintable character recognition has heretofore been accomplished when a particular character to be printed has failed to result in a compare with a character on the type train during the actual printing operation, which results in a Data Check condition which severely degrades the print rate from, for example, a 2,000 lines per minute rate to an average of 225 lines per minute.

SUMMARY OF THE INVENTION

Generally stated, it is an object of this invention to improve the print rate of a high speed printer.

Another object of this invention is to minimize the degradation of the print rate of a high speed printer as a result of unprintable characters, because characters are placed in a print line buffer to be printed which do not appear on the type train.

It is also an object of this invention to permit full utilization of the flexibility of a universal character set buffer for storing coded representations of graphics on a type train in a printer which has a high rate of operation capability, without incurring a relatively high degradation of print rate because of characters in the print line buffer which are not represented in the particular type train being used.

It is an important object of the invention to provide for representing each character on the type train of a printer by a single bit stored at a specific address in an associative bit field and for directly accessing such address to determine the presence or absence of such a bit when each character to be printed is being loaded into the print line buffer.

Another object of this invention is to provide for using a print line buffer data register to address an associative bit field of a universal character set buffer while loading the print line buffer so as to determine if a character in the register is represented by a bit in a particular address of the associative field.

It is also an important object of this invention to provide for directly accessing a particular address in an associative bit field of a universal character set buffer from a print line buffer register in accordance with the binary value of the bits representing the character in the register, during loading of the buffer, to determine if the character being loaded is represented in the type train.

Another important object of the invention is to provide for forcing a particular base address on the universal character set buffer during loading of a character into a print line buffer, and superimposing on the forced address a count which is equal to the binary value of the bits in the character representation, so as to access a particular storage location for an associative bit for the particular character, to determine whether the character is represented in the type train.

Other objects, features and advantages of the invention will be apparent from the following, more detailed description of a preferred embodiment of the invention as illustrated in the accompanying drawing.

DESCRIPTION OF THE DRAWING

In the drawing:

FIG. 3 shows the physical arrangement of FIGS. 2*a* – 2*d*.

DESCRIPTION OF A PREFERRED EMBODIMENT

Figure 1A:
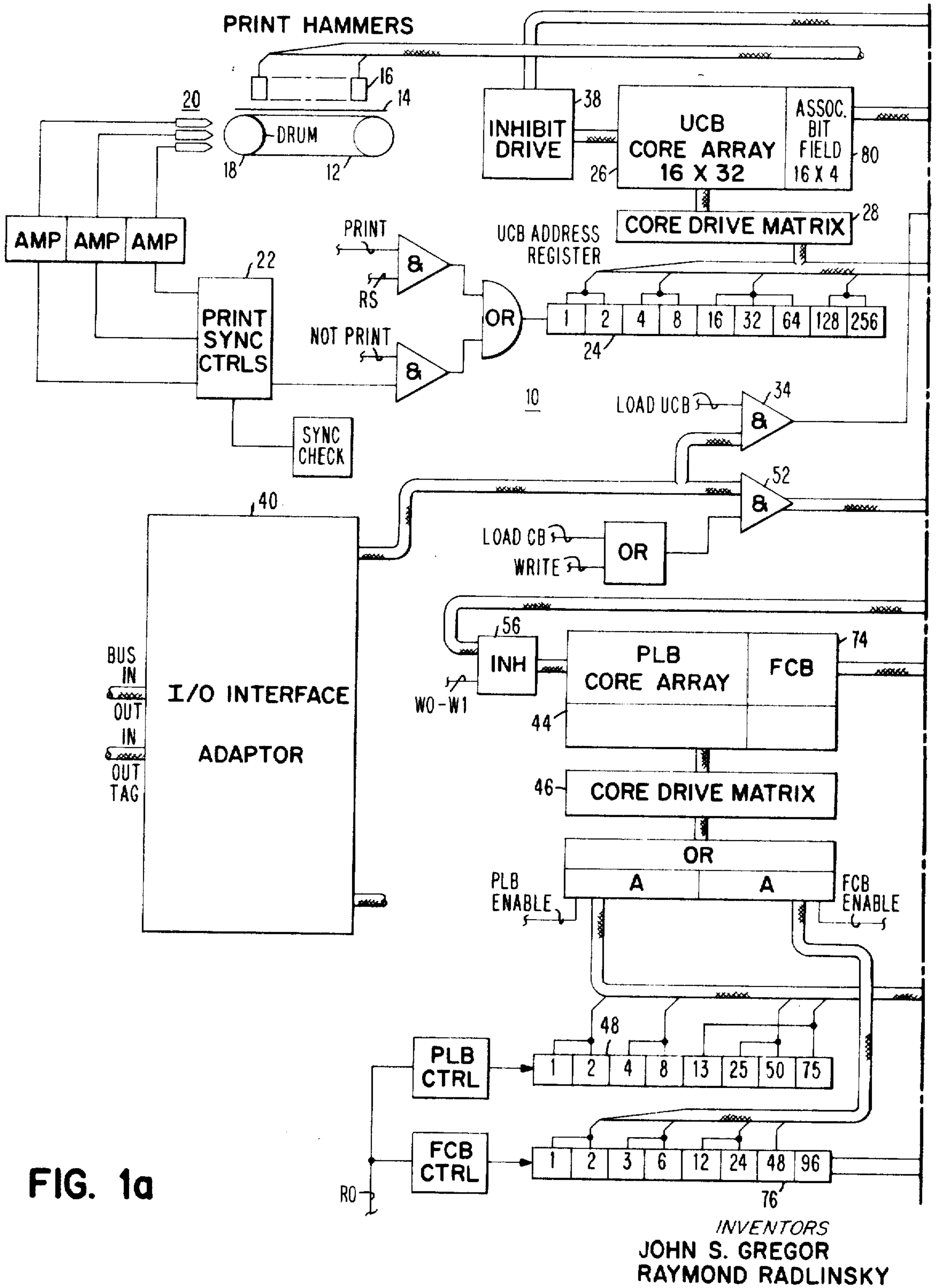
FIGS. 1*a* and 1*b* together are a schematic block diagram of a printer control system embodying the invention in one of its forms, FIGS. 2*a* – 2*d* together provide a schematic circuit diagram of the universal character set buffer and the core matrix drive therefore in the system of FIGS. 1*a* and 1*b*.
Figure 1B:
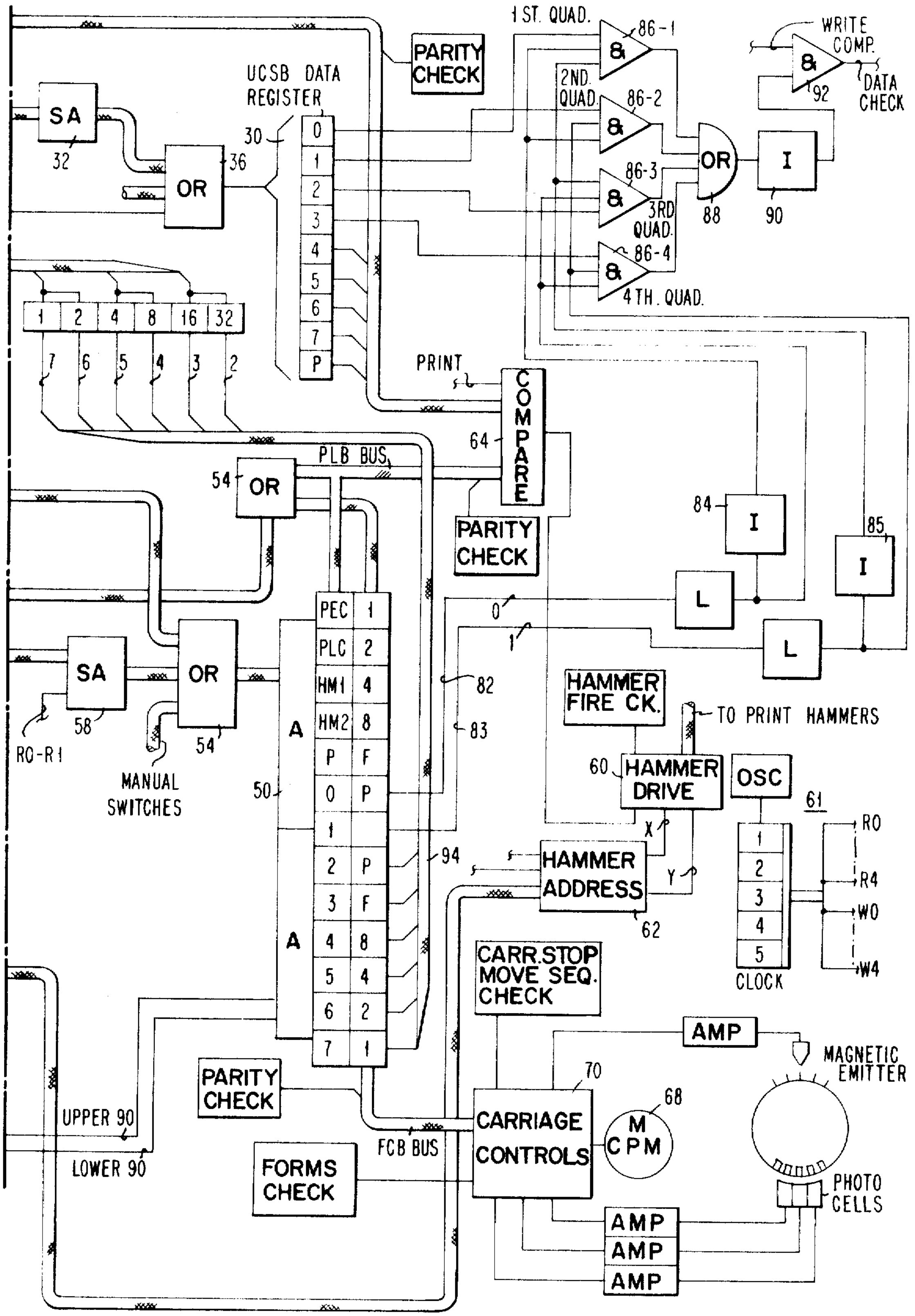
Figures 2, 2D:
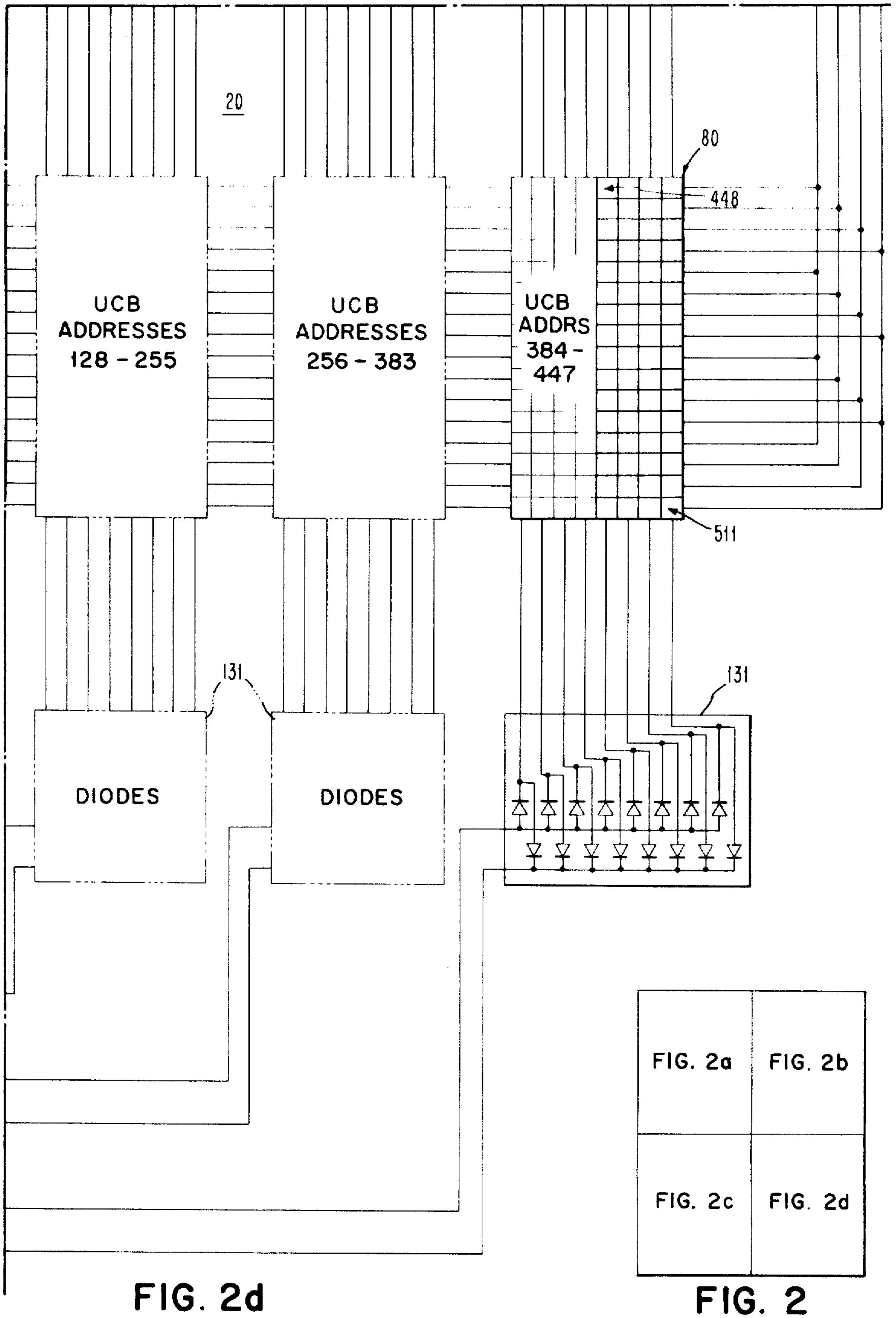
Figure 2A:
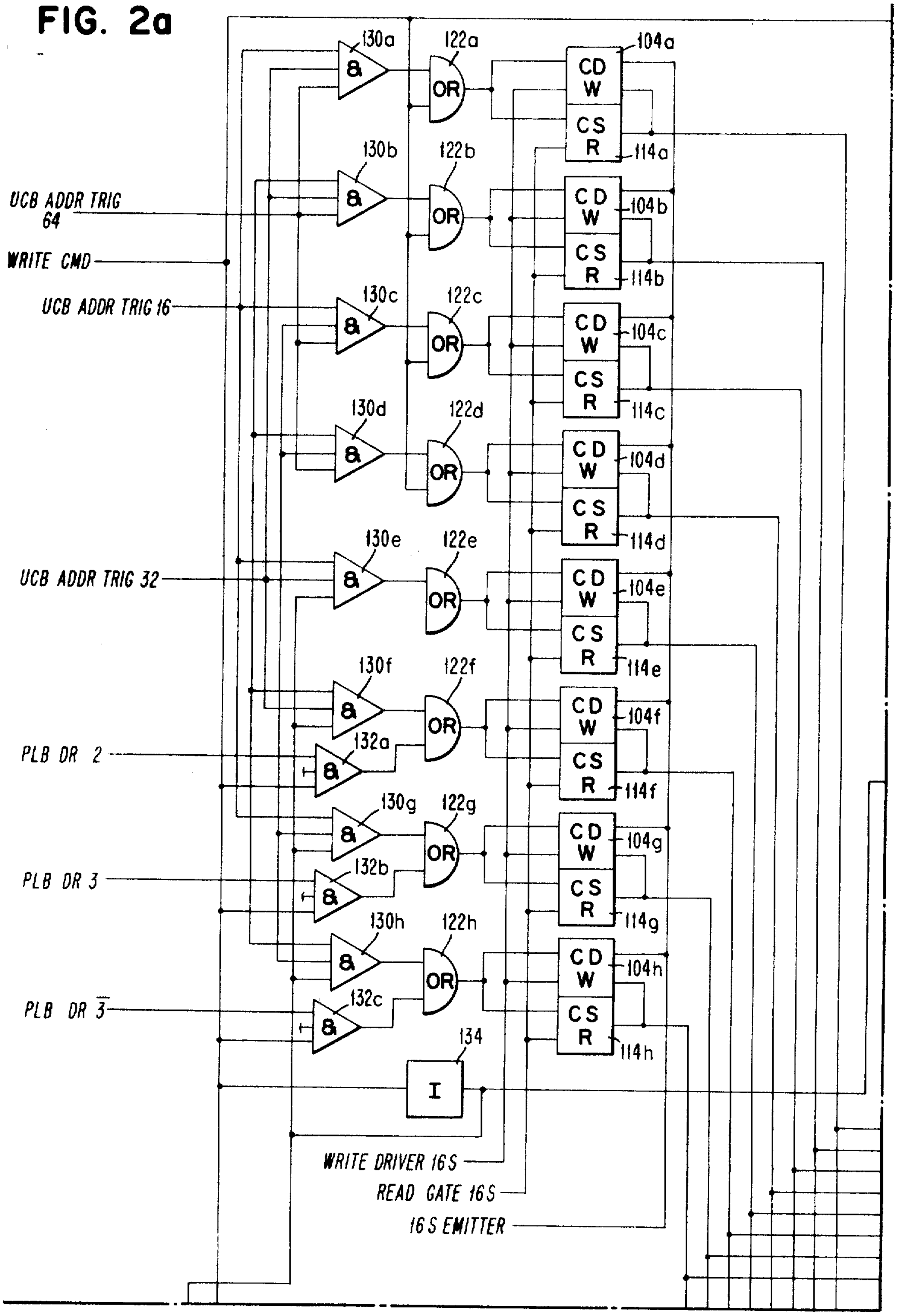
Figure 2B:
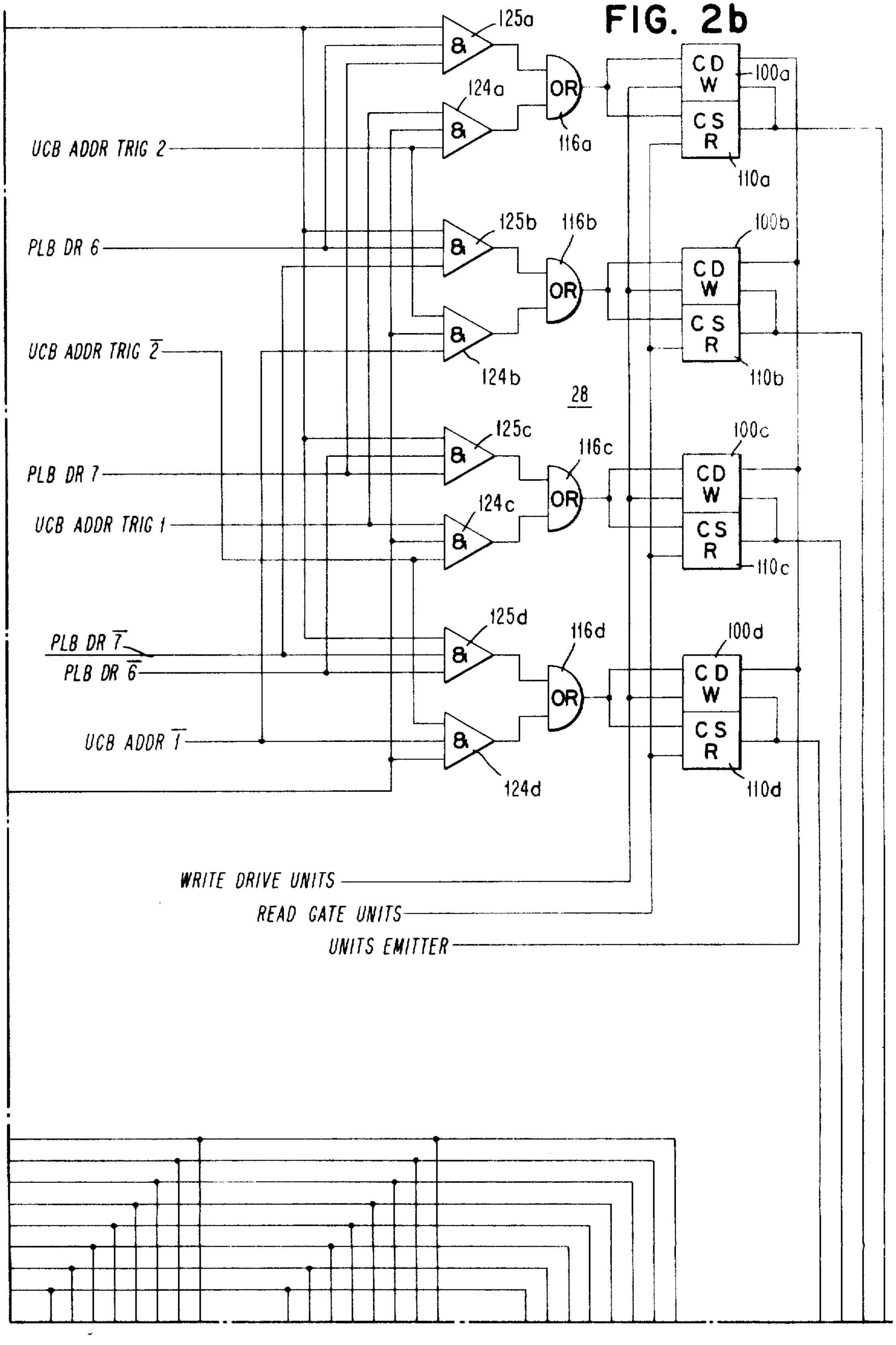
Figure 2C:
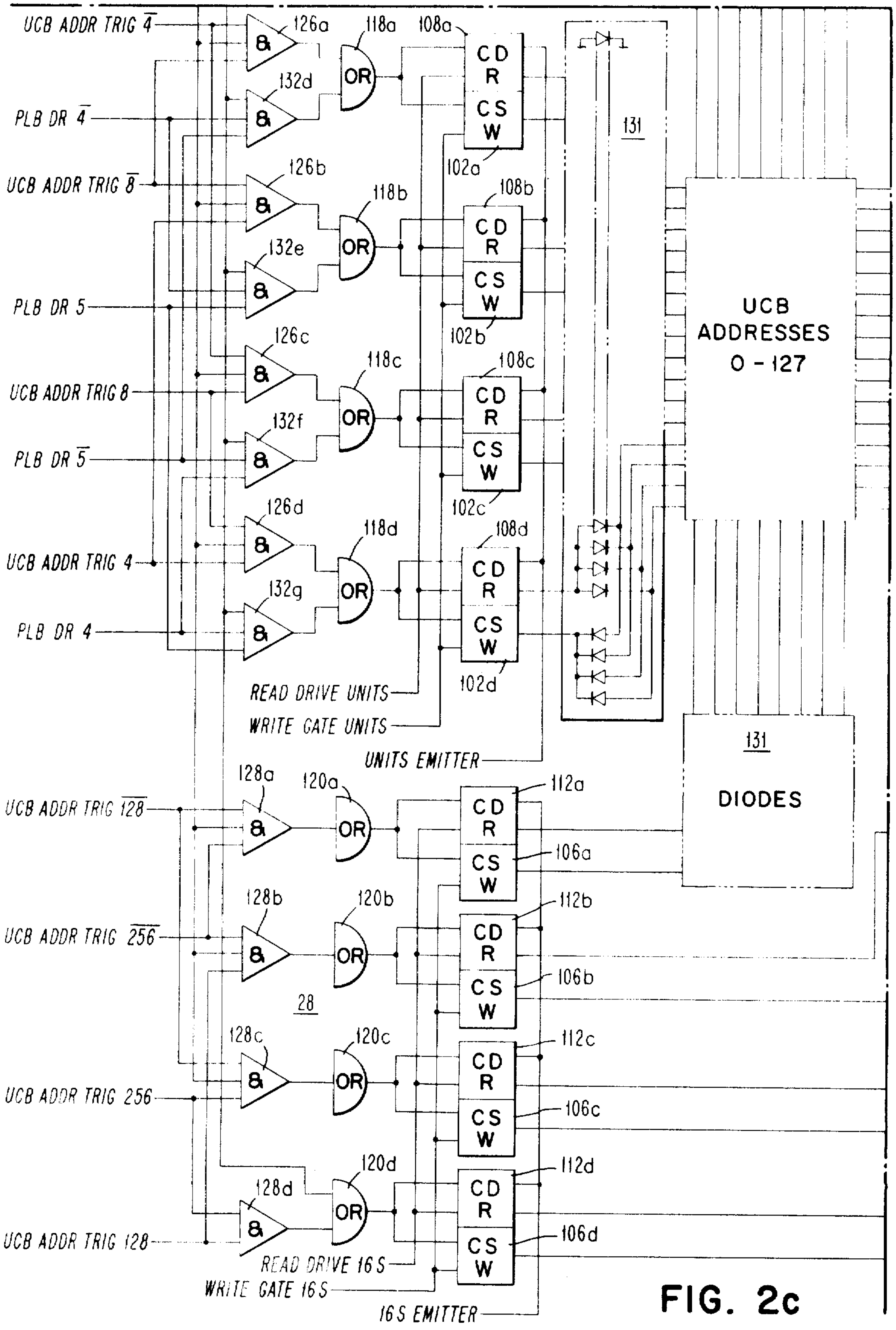

Referring to the schematic block diagram of FIGS. 1*a* and 1*b*, the reference numeral 10 denotes generally a control system for a high speed printer, which is represented by a Type Train 12 bearing a plurality of type characters of graphics, which are moved continuously along a print line past a Document 14, for impacting with the document by means of a plurality of print hammers represented by the Hammers 16. A Timing Drum 18 driven with the type train provides a plurality of timing signals sensed by Sensing Heads 20 for controlling Printer Controls 22. The Controls 22 are used to operate a Universal Character Buffer Address Register 24, which addresses a storage device such as the Universal Character Buffer Core Array 26 through a Core Drive Matrix 28, to determine what character is in each particular print position. A Data Register 30 is used to read out coded character representations in different addresses from the Core Array 26 through a plurality of Sense Amplifiers 32 and for loading the Core Array 26 through AND 34, OR 36 and Inhibit Drivers 38 from an I/O interface Adapter 40, which provides a connection between the control system and a central processing unit (not shown).

Characters which are to be printed on the Document 14 have coded representations thereof comprising different combinations of 8 bits and a parity bit stored in a storage device such as the Print Line Buffer Core Array 44, which is addressed by a Core Drive Matrix 46 from a Print Line Buffer Address Register 48. Data is loaded into the Print Line Buffer Core Array 44 from a Print Line Buffer Data Register 50 from an I/O Interface Adapter 40 through AND 52 and thence, through OR 54 and Inhibit Drivers 56. Sense Amplifiers 58 are used to read out the data into the Data Register 50.

Control of the Print Hammers 16 is effected by Hammer Drive Circuits 60 under the control of Hammer Address Circuits 62 and the output of a Compare Circuit 64, which compares data in the Universal Character Buffer Data Register 30 with the character being read from the Print Line Buffer Core Array 44 in Print Line Buffer Data Register 50 to cause firing of a particular Print Hammer 16, when the character on the Type Train 12 opposite the hammer is equal to the character to be printed in that print position on the Document 14. A Clock 61 provides the necessary R0-R4 and W0–W4 clock times for the address registers, inhibit drivers, hammer address circuits, etc.

The Document 14 is advanced by means of a Carriage Motor 68 under the control of Carriage Controls 70 in response to forms control data in the Data Register 50, which contains data read from a Forms Control Buffer Array 74, which may form part of, or be physically adjacent to, the Print Line Buffer Core Array 44 and is shown as addressed by the same Core Drive Matrix 46 under the control of a Forms Control Buffer Address Register 76.

In order to better provide for checking whether a character having a coded representation stored in the Print Line Buffer Core Array 44 is represented by a corresponding character having a graphic on the Type Train 12 with a coded representation stored in the Universal Character Buffer Core Array 26, an additional storage section or field is provided in conjunction with the UCB Core Array 26 designated the Associative Bit Field 80. This field has a plurality of address positions equal to the number of different type characters appearing on the Type Train 12, for example, 64 different address positions representing the 64 different type characters on the Type Train 12, each having a plurality of bit positions. When the Universal Character Buffer Core Array 26 is initially loaded with the coded representations of the characters appearing on the particular Type Train 12 being used, an associative bit is stored at a specific address for each different type character having a representation loaded into the UCB Core Array 26. Referring to the UCB Data Register 30, it will be seen that each address position has 9 bit positions designated 0 through 7 and P for a parity bit. The associative bits are stored in one of the first 4 bit positions 0 – 3, depending on the quadrant designation of the different class of characters on the type train, as illustrated in Tables I – IV of the Appendix. For a first quadrant character, as shown in Table I, a bit would be stored at the particular address in bit position 0: for a second quadrant character, as shown in Table II, an associative bit would be stored in the second or 1-bit position: for a third quadrant character, such as a lower case alphabetic character, shown in Table III, an associative bit would be stored in the third or 2-bit position: for a fourth quadrant character, such as a capital alphabetic character, a bit would be stored in the fourth or 3-bit position.

When a character is being loaded into the Print Line Buffer Core Array 44, and while it is in the Print Line Buffer Data Register 50, the bit contents of the 0 and 1 positions are compared over Lines 82 and 83 and through Inverters 84 and 85 with the contents of the 0, 1, 2 and 3-bit positions of the Universal Character Buffer Data Register 30 through ANDs 86–1, 86–2, 86–3 and 86–4 to determine whether the quadrant representation in the Universal Character Buffer Data Register and the Print Line Buffer Data Register are the same. As shown in Tables I – IV, the 0 and 1 bit positions for a first quadrant character contain 0,0; for the second quadrant 0,1; for the third quadrant 1,0; and for the fourth quadrant 1,1. The tables are shown only in part, by way of example, the coded registrations being well-known. The outputs of the ANDs are applied through an OR 88, Inverter 90 and an AND 92 to provide a Data Check signal in the event that a comparison is not obtained.

The output of Data Check AND 92 can be used to set a Print Error Check Bit for each position where a Data Check has occurred. After the data has been transferred, an Execute or Print Cycle occurs. During the Print Cycle each position identified by a Print Error Check Bit will not be compared or printed which prevents degradation of the print rate.

Addressing of the Associative Bit Field 80 of the Universal Character Buffer Core Array 26 through the Core Drive Matrix 28 is obtained by connecting the 2, 3, 4, 5, 6 and 7 bit positions of the Print Line Buffer Data Register 50 to the Core Drive Matrix 28 over a Cable 94. The Data Register 50 is so connected to the Core Drive Matrix 28 that an address is accessed in the Associative Bit Field 80 corresponding to the binary value of the binary bit positions of the Data Register 50. Thus, each time a character is loaded into the Print Line Buffer 44, the Associative Bit Field 80 is accessed directly to determine whether an associative bit is stored therein at an address corresponding to the binary value of the bits, designating that the character being loaded is one represented on the Print Train 12.

Referring to FIGS. 2*a* through 2*d*, it will be seen that the Universal Character Buffer Core Array 26 comprises Addresses 0 through 447, while the Associative Bit Field 80 comprises Addresses 448 through 511. These addresses are accessed by means of X-Write Drivers 100*a–d*, X-Write Switches 102*a–d*, Y-Write Drivers 104*a–h* and Y-Write Switches 106*a–d*. X-Read Drivers 108*a–d*, X-Read Switches 110*a–d* and Y-Read Drivers 112*a–d* and Y-Read Switches 114*a–h* are used to address the Universal Character Set Buffer Addresses 0–447, as well as the Associative Bit Field Addresses 448–511 in the usual X–Y manner. Control of the X-Write Drivers and X-Read Switches is effected through ORs 116*a–d;* control of the X-Write Switches and the X-Read Drivers is effected through ORs 118*a–d*. ORs 120*a–d* are used to control the Y-Read Drivers and the Y-Write Switches while ORs 122*a–h* are used to control the Y-Read Switches and the Y-Write Drivers. ANDs 124*a–d* provide control through the ORs 116*a–d* in response to outputs from the Universal Character Buffer Address Register 24. ANDs 126*a–d* provide for controlling the X-Write Switches and the X-Read Drivers through ORs 118*a–d* in response to outputs of the Universal Character Buffer Address Register 24. ANDs 128*a–d* provide for controlling the Y-Read Drivers and the Y-Write Switches through ORs 120*a–d* from the Universal Character Buffer Register 24 in conjunction with ANDs 130*a–h* through the ORs 122. Diodes 131 are used in connection with the X-Read Drivers and Write Switches, as well as with the Y-Read Drivers and Write Switches.

In order to provide for selectively addressing the Associative Bit Field Address Positions 448 through 511 of Associative Bit Field 80 from the Print Line Buffer Data Register 50 without effecting the Addresses 0 through 447 of the Universal Character Buffer 26, ANDs 132*a–g* are provided for selectively addressing the Associative Bit Field Address Positions 448 through 511 through ORs 118*a–d* and 122*f–h* in response to outputs from the Print Line Buffer Data Register 50 Positions 2 through 7. An Inverter 134 is provided for connection to the ANDs 126*a–d*, 128*a–c*, and 130*e–h* for inhibiting the Y-Drive to the Universal Character Buffer Addresses 0 through 447 during a Write Command. A connection from the Write Command input is made to ORs 122*a–d*, and OR 120*d* to force counts of 64, 128 and 256 to in effect address Associative Bit Positions 228–511 during a Write Command. For different Associative Bit Field arrangements different counts could be forced so as to access the proper associative bit positions.

While the bit representation for a character is in the Print Line Buffer Data Register 50, for example, the coded representation for a capital A is 11000001, the first two bits, namely the 11, will be read off over Conductors 82 and 83 and applied to ANDs 86–3, 86–4 and 86–2, 86–4, respectively. Since the capital A is a fourth quadrant character, a bit will appear in the Associative Bit Field 80 in the 3-bit position so that all inputs to the AND 86–4 will be energized and an output will be directed to OR 88 to Inverter 90 providing a 0 output to the AND 92 indicating a valid check.

Addressing of the particular address for the associative bit in the Field 80 is accomplished by utilizing the remaining bit positions, namely, the 2, 3, 4, 5, 6 and 7 bit positions of the Print Line Buffer Data Register 50. It will be seen that for a capital A, a 1 appears in only the 7-bit position, so that the numerical value of these bit positions is unity. Accordingly, the output of the 7-bit position is utilized to address the 448+1 or 449 address of the Field 80. It is applied through AND **125*c* and OR 116*c* to Read Switch 110*c*, while Read Driver 108*a* is energized through OR 118*a* and AND 132*d* in response to Print Line Buffer Driver $\bar{4}$ and Print Line Buffer $\bar{5}$. Y-Read Driver 112*d* is turned on through AND 128*d* and OR 120*d*, while X-Read Switch 114*d* is turned on through OR 122*d* in response to Write Command. This addresses Associative Bit Field Position 449. Since a bit is stored in Bit Position 3 of Address 449, an output will be applied to AND 86–4 to be matched with the 1-bit position in the 0 and 1 bits of the Print Line Buffer Data Register 50,** so as to give a valid data check. It will be realized that the addressing is non-code dependent and can readily be used for any number of different code arrangements.

Accordingly, whenever a character is read into the Print Line Buffer 40 and appears in the Data Register 50, a direct access of the Associative Bit Field 80 can be made at an address, which is dependent on the numerical value of the bit positions representing the character, and the presence of an associative bit at this address determines that the character is a valid character and has a counterpart on the type train and so can be printed. This minimizes the time that the document will be held at the print line and hence, reduces smudging.

While the invention has been particularly shown and described with reference to a preferred embodiment thereof, it will be understood by those skilled in the art that various changes in form and details may be made therein without departing from the spirit and scope of the invention.

ASSOCIATIVE BIT ASSIGNMENT — TABLE I

BIT POSITION 0 (1st Quadrant)

| UCB Address | Graphic & Control Symbols EBCDIC | System/360 8-Bit Code |
|---|---|---|
| 448 | | 00000000 |
| 449 | | 00000001 |
| 450 | | 00000010 |
| 451 | | 00000011 |
| 452 | PF | 00000100 |
| 453 | HT | 00000101 |
| 454 | LC | 00000110 |
| 455 | DEL | 00000111 |
| 456 | | 00001000 |
| 457 | | 00001001 |
| 458 | | 00001010 |
| 459 | | 00001011 |
| 460 | | 00001100 |
| 461 | | 00001101 |
| 462 | | 00001110 |

| | | |
|---|---|---|
| 493 | | 00101101 |
| 494 | | 00101110 |
| 495 | CU3 | 00101111 |
| 496 | | 00110000 |
| 497 | | 00110001 |
| 498 | | 00110010 |
| 499 | | 00110011 |
| 500 | PN | 00110100 |
| 501 | RS | 00110101 |
| 502 | UC | 00110110 |
| 503 | EOT | 00110111 |
| 504 | | 00111000 |
| 505 | | 00111001 |
| 506 | | 00111010 |
| 507 | | 00111011 |
| 508 | | 00111100 |
| 509 | | 00111101 |
| 510 | | 00111110 |
| 511 | | 00111111 |

ASSOCIATIVE BIT ASSIGNMENT TABLE II
BIT POSITION 1 (2nd Quadrant)

| UCB Address | Graphic & Control Symbols EBCDIC | System/360 8-Bit Code |
|---|---|---|
| 448 | SP | 01000000 |
| 449 | | 01000001 |
| 450 | | 01000010 |
| 451 | | 01000011 |
| 452 | | 01000100 |
| 453 | | 01000101 |
| 454 | | 01000110 |
| 455 | | 01000111 |
| 456 | | 01001000 |
| 457 | | 01001001 |
| 458 | ¢ | 01001010 |
| 459 | . | 01001011 |
| 460 | < | 01001100 |
| 461 | ( | 01001101 |
| 462 | + | 01001110 |

| | | |
|---|---|---|
| 493 | — | 01101101 |
| 494 | > | 01101110 |
| 495 | ? | 01101111 |
| 496 | | 01110000 |
| 497 | | 01110001 |
| 498 | | 01110010 |
| 499 | | 01110011 |
| 500 | | 01110100 |
| 501 | | 01110101 |
| 502 | | 01110110 |
| 503 | | 01110111 |
| 504 | | 01111000 |
| 505 | | 01111001 |
| 506 | : | 01111010 |
| 507 | # | 01111011 |
| 508 | @ | 01111100 |
| 509 | ' | 01111101 |
| 510 | = | 01111110 |
| 511 | " | 01111111 |

ASSOCIATIVE BIT ASSIGNMENT TABLE III
BIT POSITION 2 (3rd Quadrant)

| UCB Address | Graphic & Control Symbols EBCDIC | System/360 8-Bit Code |
|---|---|---|
| 448 | | 10000000 |
| 449 | a | 10000001 |
| 450 | b | 10000010 |
| 451 | c | 10000011 |
| 452 | d | 10000100 |
| 453 | e | 10000101 |
| 454 | f | 10000110 |
| 455 | g | 10000111 |
| 456 | h | 10001000 |
| 457 | i | 10001001 |
| 458 | | 10001010 |
| 459 | | 10001011 |
| 460 | | 10001100 |
| 461 | | 10001101 |
| 462 | | 10001110 |

| | | |
|---|---|---|
| 493 | | 10101101 |
| 494 | | 10101110 |
| 495 | | 10101111 |
| 496 | | 10110000 |
| 497 | | 10110001 |
| 498 | | 10110010 |
| 499 | | 10110011 |
| 500 | | 10110100 |
| 501 | | 10110101 |
| 502 | | 10110110 |
| 503 | | 10110111 |
| 504 | | 10111000 |
| 505 | | 10111001 |
| 506 | | 10111010 |
| 507 | | 10111011 |
| 508 | | 10111100 |
| 509 | | 10111101 |
| 510 | | 10111110 |
| 511 | | 10111111 |

ASSOCIATIVE BIT ASSIGNMENT TABLE IV

BIT POSITION 3 (4th Quadrant)

| UCB Address | Graphic & Control Symbols EBCDIC | System/360 8-Bit Code |
|---|---|---|
| 448 | | 11000000 |
| 449 | A | 11000001 |
| 450 | B | 11000010 |
| 451 | C | 11000011 |
| 452 | D | 11000100 |
| 453 | E | 11000101 |
| 454 | F | 11000110 |
| 455 | G | 11000111 |
| 456 | H | 11001000 |
| 457 | I | 11001001 |
| 458 | | 11001010 |
| 459 | | 11001011 |
| 460 | ⑀ | 11001100 |
| 461 | | 11001101 |
| 462 | ⑂ | 11001110 |
| | | |
| 493 | | 11101101 |
| 494 | | 11101110 |
| 495 | | 11101111 |
| 496 | 0 | 11110000 |
| 497 | 1 | 11110001 |
| 498 | 2 | 11110010 |
| 499 | 3 | 11110011 |
| 500 | 4 | 11110100 |
| 501 | 5 | 11110101 |
| 502 | 6 | 11110110 |
| 503 | 7 | 11110111 |
| 504 | 8 | 11111000 |
| 505 | 9 | 11111001 |
| 506 | | 11111010 |
| 507 | | 11111011 |
| 508 | | 11111100 |
| 509 | | 11111101 |
| 510 | | 11111110 |
| 511 | | 11111111 |

We claim:

1. Printer apparatus comprising the combination with a print mechanism having a type train with a plurality of type characters movable past print positions on a document for printing on said document, and hammer means operable to impact said document and type characters to print characters on said document, first storage means storing coded representations of characters to be printed by said printer apparatus, and second storage means storing representations of characters in said type train, wherein the improvement comprises third storage means storing an associative bit at a different address represented by the numerical value of the bits of the coded representation for each different character loaded into said second storage means, a register connected to said first storage means for loading coded representations of characters to be printed into said first storage means, circuit means connecting said register to said third storage means to directly access a particular address in said third storage means represented by the value of a coded representation in said register to detect if said coded representation is a valid character on said type train and has an associative bit stored at said particular address, and means connecting said first storage means and said second storage means for controlling said hammer means to print characters on said document having coded representations in said first storage means.

2. The invention as defined in claim 1 characterized by said third storage means comprising a portion of said first storage means.

3. The invention as defined in claim 2 characterized by each portion of said third storage means having a plurality of bit positions, and the bits of said coded representations used to detect said particular address in said third storage means comprising less than all of said plurality of bit positions.

4. The invention as defined in claim 3 characterized by a predetermined number of bits of said coded representations in different addresses in said third storage means being used to designate different classes of characters being loaded into said second storage means.

5. The invention as defined in claim 4 characterized by the associative bit at each particular address being stored in a different bit position in said third storage means dependent on the different class of character on the type train it is associated with.

6. The invention as defined in claim 5 characterized by compare means connected to said third storage means and to said register to check the presence and class designation of the associative bit in said third storage means with that of said character in said register.

7. The invention as defined in claim 6 characterized by said circuit means connecting said register to said third storage means including means responsive to a Write Command to add a predetermined count to address means of said first storage means to force a predetermined address upon the value of the bits in the coded representation of a character in said register to access the particular address of the associative bit in said third storage means.

8. The invention as defined in claim 7 characterized by said circuit means connected to address said first storage means and said third storage means portion of said first storage means, said circuit means being also connected to said register and including inverter means connected to inhibit addressing positions of said first storage means generally when accessing an address of said third storage means portion of said first storage means.

9. The invention as defined in claim 8 characterized by said circuit means connecting said register to said third storage means portion of said first storage means being connected to respond to a Write Command signal to add a predetermined count to force said predetermined address in said third storage means portion of said first storage means and inhibit accessing other portions of said first storage means.

* * * * *